Aug. 13, 1968    H. HERZOG    3,396,884
MULTILAYER STRAP FOR WRISTWATCHES OF THERMOPLASTIC MATERIAL
Filed April 26, 1966

Inventor:
HILMAR HERZOG

United States Patent Office 3,396,884
Patented Aug. 13, 1968

3,396,884
MULTILAYER STRAP FOR WRISTWATCHES
OF THERMOPLASTIC MATERIAL
Hilmar Herzog, Nottingen, near Pforzheim, Germany, assignor to Gustav Bauer KG, Ellmendingen-Baden, Germany, a corporation of Germany
Filed Apr. 26, 1966, Ser. No. 545,402
Claims priority, application Germany, Dec. 8, 1965, H 57,902
7 Claims. (Cl. 224—4)

ABSTRACT OF THE DISCLOSURE

Three layers of thermoplastic materials are bonded together at their longitudinal edges, and just beyond the loops to attach a buckle, or a wristwatch pin; the top layer is folded over to form pin-receiving loops, and a bottom layer is attached between the bulges formed by the loops, by the continuous bonding along the longitudinal edges and beyond the loops.

---

The present invention relates to a multilayer watch strap made of thermoplastic material, and more particularly to a watch strap which consists of two parts and is formed with a loop to permit the pin from a watch casing to be passed through the loops of each part; one of the parts will then be supplied with a buckle and the other will have holes formed therein for engagement with the buckle; and the invention further relates to a method for the manufacture of such wristwatch straps in a simple and expeditious manner.

Most wristwatch straps contain a plurality of layers— a top layer which may be decorative, embossed, or otherwise of pleasing appearance; a bottom layer which is wear-resistant; and an intermediate layer in order to provide body, or thickness to the strap. Any one, or all of the layers, may be made of thermoplastic material, preferably reinforced with a textile material. The insert, which is preferably also of thermoplastic material reinforced by textiles, may be arranged to form a loop through which pins of the watch casing, and of the buckle can be placed. In order to form such a loop, the insert is bent over into a reentrant loop and the longitudinal cover layers, that is the top and the bottom layers, end just short of the loop. The top and bottom layers then are seamed, or bonded together and to the intermediate layer, for example by a thermoplastic heat-and-compression bond, so that the top and bottom layers end in a seal, or seam, and not immediately adjacent the loop. Such a construction has been previously described (German Utility Model 1,870,628). In actual use, it has been found that the thermal compression seam, in the thermoplastic material, has to be made very carefully in order to avoid that the seam opens under continued use and when the strap is being stretched.

Another construction, which has been proposed (see for example my U.S. patent application Ser. No. 451,474) utilizes loops which are obtained by bending over the ends of a single layer strap, and seaming the end piece to the underlaying top material at its edge. It has been found that the bent-over edge, terminating in a blunt end, and forming a step-like thickening detracts from the pleasing appearance of the ribbon, and may interference with the snug fitting of the strap to the arm of the user. In order to avoid a regional thickening, it has been suggested to form the thermal compression bond in such a manner that the material is thinned; this has the disadvantage of a weakening just at the point of stress, without obtaining a smooth inner surface of the wristwatch strap, because the bent-over loop again terminates in a blunt end.

It is an object of the present invention to provide a wristwatch strap which has a pleasing appearance, can be manufactured economically, and presents a smooth inner surface as well as having a smooth upper surface which can readily be arranged to have a decorative appearance.

It is a further object of the present invention to provide a manufacturing method for wristwatch straps, which is simple, inexpensive, and lends itself to be carried out by automatic machinery.

Briefly, in accordance with the present invention, a multilayer watch strap, that is a strap which has at least two layers and preferably three, is provided; the layers are of thermoplastic material which are bonded together. One of the layers, to form the upper one which may have a decorative outside surface, has its terminal end bent over to be formed into a loop to receive a watch casing, or buckle pin therethrough; the material continues and, beyond the loop, forms another layer, so that the strap as a whole will be bent over into U shape. A third layer, terminating just ahead of the loop, is placed under, or between the aforementioned layers, and extends essentially throughout the length of the strap. All layers are bonded together, both at their side edges as well as transversely close to the loop formed by the bent-over top layer.

When a pair of loops are to be formed, one to receive a watch casing pin, and the other to receive a buckle pin, then the bent-over extension of material, forming the intermediate, or bottom layer are terminated so that they butt against each other; if the strap is to form the attachment ends, with holes to be placed therethrough to receive the bail of the buckle, then both layers are preferably coextensive.

The method, according to the invention, of making such a strap consists of feeding a strip of material, approximately twice the length of the strap, and folding the material over to form the loop; a third strip of material, to form a third layer is fed below, or intermediate of the folded strip; it has a width slightly less than the width of the folded-over strip (when folded). These strips are fed continuously to a heat sealing and seaming station, at which the bonding takes place; at the same time, as the edges and the transverse bond is made, the die, causing the thermoplastic material to bond together weakens the material at the edges so that the completed strap can be broken out from the continuously fed strips of the material.

Preferably, the third layer formed by a separate strip of material is the bottom layer, having a smooth surface, compatible with the skin of the user and preferably formed to have a pleasant "feel." In order to prevent any sharp transitions of material, the heating step can be arranged so that the end of the third strip is impregnated into the other two layers so that the ends will merge, or taper into the material formed by the other layers, during the thermal-compression step, and will not present any sharp breaks or ridges.

The structure, organization and arrangement of the invention will now be described more specifically in the following detailed description with reference to the accompanying drawings, in which.

Figure 2:
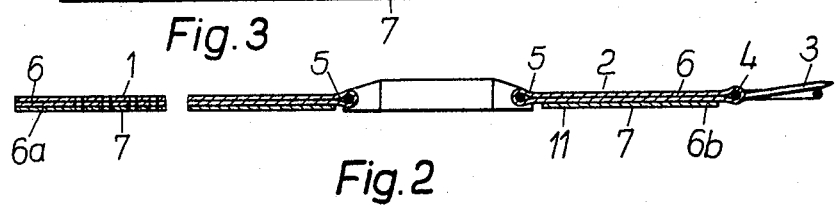
FIG. 2 is an axial, cross-sectional side view, with the watch shown schematically.
Figure 1:
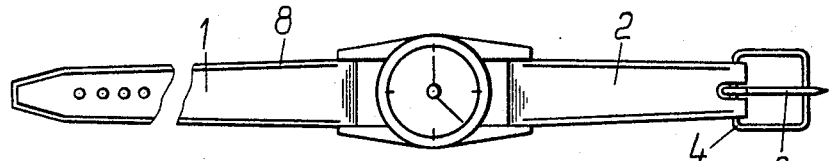
FIG. 1 is a top view of a wristwatch strap, in combination with a watch, in accordance with the present invention.

Referring now to the drawings, and particularly FIGS. 1 and 2: The wristwatch strap consists of two parts, 1, and 2; part 1 is formed with holes and part two is arranged to receive the buckle 4, having a bail 3, to cooperate with the holes in part 1. Each one of the strap parts is formed with a loop at the end, shown at 5 in FIG. 2; part 2 has two such loops, one to receive the pin of the wristwatch and the other the cross pin of the buckle 4.

Figure 3:
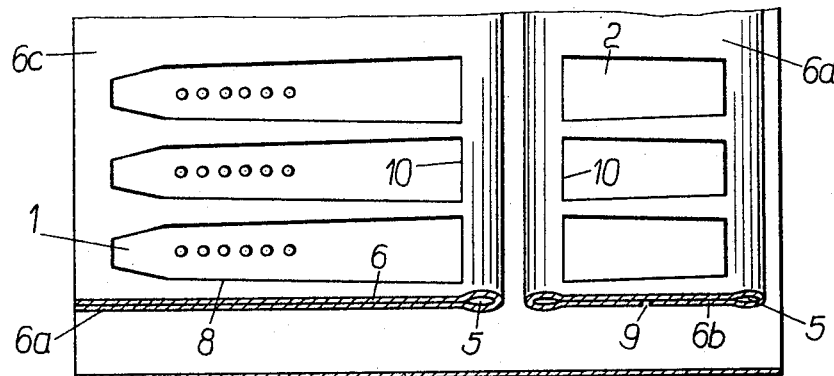
FIG. 3 is a partly perspective, partly sectional view of straps during their manufacture.

The strap has three superimposed layers. Top layer 6, which is preferably arranged to have a decorative appearance, is bent over into U shape, forming loop 5; the second leg of the U forms an intermediate layer 6a, which is bonded to a bottom layer 7 beneath layer 6a. Intermediate 6a extends essentially over the same length as layer 6, as is apparent from FIGS. 2 and 3. Layers 6, 6a and 7, are bonded together at their edge outline by a thermal compression seam 8. The strap part 2, which has to have two loops to receive both the watch and the buckle, is folded in such a manner that two U shaped loops are formed; intermediate layer 6b of strap part 2 is bent so that the ends thereof butt together at an intermediate, preferably centrally located point 9 (FIG. 3). Again, bottom layer 7 is placed beneath the intermediate layers 6b and its junction 9 to present a smooth outline at the inside of the strap to the skin of the wearer. In addition to the seam along the outline of the strap, seam 8, another compression bond, or seam 10 (FIG. 3) is arranged, transversely to the direction of the strap, and to close off loops 5. This transverse seam 10 also terminates the ends of the bottom layer 7. Preferably it is made in such a way that the transverse end of layer 7 tapers, or merges, into the thickness into the layer 6a, 6b respectively in region 11 (FIG. 2). This can be achieved easily by melting the bottom layer 7 in its terminal region.

The material for the top layer 6 preferably has in its inner side a porous textile material, not further shown in the drawings. When the top layer 6 is folded into the U shape, textile layers of part 6 and 6a, or 6 and 6b, respectively, will be superimposed. When these layers are bonded together, and bonded also with a bottom layer 7, the thermoplastic material of adjacent layers melts together, filling any spaces between the pores of the textile material. The porous textile layer may be applied to the thermoplastic material 6 either by an adhesive, or by being embedded therein; when the top layer 6 is folded over to form the loops 5, the loops 5 are strengthened thereby, without appreciably increasing the thickness of the entire strap, and without being visible to the outside. As the layers are seamed together at edges 8, and at the transverse seam 10, the melting thermoplastic material does not interfere with the mechanical strength of the textile material. The textile material may, itself, consist of a thermoplastic, which will melt in the region of the bonds 8 and 10. When applying such a thermoplastic textile material to the underside of layers 6, 6a (and 6b, respectively) it is of advantage that the threads of the textile material are melted together only in the region at their own cross-over points. This results in high mechanical strength, while maintaining porosity of the textile layer so that, when the various layers are seamed together at their bonding regions 8, 10 there will be sufficient space between the pores of textile threads to provide for melting of the thermoplastic material therethrough.

Loops 5, by being formed in this manner, will have an excellent stability since the folded-over layers 6, 6a (or 6b, respectively) are seamed along the entire length of the edges; the appearance of the strap, both in the region of the strap length as well as in the region of the loops is not impaired by the seaming operation and can readily be made to simulate the most expensive leather straps.

Figure 4:
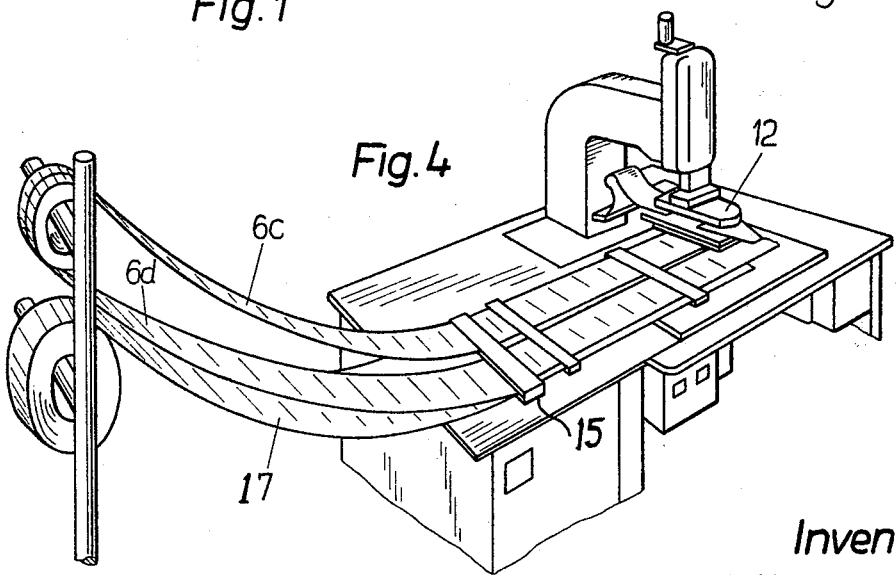
FIG. 4 is a perspective, schematic view of an apparatus to carry out the method of manufacture of the wristwatch straps.

Layers 6, 6a (and 6b, respectively) can of course be formed by hand and assembled to a bottom layer 7, then to be seamed together in an individual operation. An advantageous method of manufacture of such straps, which lends itself readily to mass production, will be described in connection with FIGS. 3 and 4. A continuous, flat strip 6c, and 6d is fed to a folding station 15, only schematically illustrated. Strips 6c, 6d are long enough to form both layers 6, and 6a at part 1, as well as layers 6 and 6b of part 2, respectively. A strip 17, to form the bottom layer 7, is fed beneath strips 6c, 6d. A thermoplastic compression die 12, only schematically illustrated, simultaneously forms seams 8 and 10 and bonds together the strips 6c, 6d, and strip 17 to form the layers 6, 6a, and 7 and 6, 6b, and 7 respectively. The die can be arranged to taper slightly, and provide for slightly increased heating in the region 11 to provide for melting-in of layer 7 into the material of layers 6, 6a, and 6, 6b respectively, and provide for a tapered, merging termination of layer 7. Prior to entry beneath the die, strip 17 is preferably slit and cut. Alternatively, a plurality of strips similar to strip 17 and having a width already of the proper length of layer 7 can be fed beneath the strips 6c, 6d.

The several, bonded and seamed-together straps are then broken out of the entire, continuously fed strips. Fer certain applications it may be desirable to omit the bottom layer 7; this can readily be done because the surface appearance of layer 6 will then form the inner surface of the wristwatch strap which again will present a smooth appearance to the arm of the wearer. The butting of the two layers 6b can be arranged during manufacture to be precise and not leave any projecting ridges, or gaps.

The folding station 15 (FIG. 4) and the apparatus for carrying out the method of manufacture of the strap is not further illustrated in detail; reference is here had to applicant's prior application 451,474, filed Apr. 28, 1965 which illustrates a compression die, a folding station, and the guiding of the strips to fold them into the proper shape, in detail. Similar apparatus can be used to carry out the present invention.

I claim:

1. Multilayer watch strap comprising at least three layers of thermoplastic material, two of said layers being formed of a single strip of material having a porous textile material at one surface and folded into a loop with said porous, textile material surfaces facing each other to receive a watch pin therethrough, said two layers being in the form of parallel strips of material folded over and forming an upper layer and an intermediate layer therebeneath of coextensive length
   a third, bottom layer extending throughout the length of said upper and said intermediate layers and terminating just short of said loop;
   said three layers extending throughout the length of said strap and being heat-welded longitudinally together along their side edges throughout their entire length and transversely of said strip in the region just short of the loop.

2. Strap as claimed in claim 1 wherein said strap comprises a connection part.

3. Strap as claimed in claim 1 wherein said third layer merges gradually into said other layers at its terminal edge.

4. Strap as claimed in claim 1 wherein said textile material is a thermoplastic material.

5. Strap as claimed in claim 1 wherein the threads of said thermoplastic textile material are bonded at their intersection.

6. Strap as claimed in claim 1 wherein said strap comprises a buckle part, and said intermediate layer forms a pair of loops at both ends thereof, the ends of said intermediate layer butting against each other intermediate the length of said buckle part.

7. Strap as claimed in claim 1 wherein said upper layer has a decorative top surface.

References Cited

UNITED STATES PATENTS

| | | | |
|---|---|---|---|
| 2,703,914 | 3/1955 | Levine | 224—4 |
| 1,799,868 | 4/1931 | Sauer. | |
| 2,101,690 | 12/1937 | Sauer. | |
| 2,153,351 | 4/1939 | Steinberger. | |
| 2,418,904 | 4/1947 | Rugeley et al. | 161—254 |
| 2,530,441 | 11/1950 | Reinhardt et al. | |
| 2,558,007 | 6/1951 | Smith | 224—4 |

FOREIGN PATENTS 1,069,229  2/1954  France.

ROBERT G. SHERIDAN, *Primary Examiner.*

F. E. WERNER, *Assistant Examiner.*